J. M. R. GEDNEY.

WEAR IRON FOR VEHICLES.

No. 11,046. Reissued Dec. 17, 1889.

Witnesses:

D. W. Gardner

H. M. Valentine

Inventor:

Jacob M. R. Gedney,

By his Attorneys

Brosseau & Rice

N. PETERS, Photo-Lithographer, Washington, D. C.

UNITED STATES PATENT OFFICE.

JACOB M. R. GEDNEY, OF LITTLE FALLS, NEW JERSEY.

WEAR-IRON FOR VEHICLES.

SPECIFICATION forming part of Reissued Letters Patent No. 11,046, dated December 17, 1889.

Original No. 395,432, dated January 1, 1889. Application for reissue filed August 23, 1889. Serial No. 321,781.

*To all whom it may concern:*

Be it known that I, JACOB M. R. GEDNEY, of Little Falls, in the county of Passaic and State of New Jersey, have invented a new and useful Improvement in Wear-Irons for Vehicles, of which the following is a full, clear, and exact description.

This invention relates to an improvement in wear-irons for taking up the wear of the wheels of a vehicle against the body thereof, as in turning; and the object of my invention is to make such a wear-iron which shall be cheap, efficient, and durable.

To this end the invention consists of a wear-iron of novel and peculiar construction, substantially as hereinafter fully described and distinctly claimed.

Reference is to be had to the accompanying drawings, forming a part of this specification, in which similar letters of reference indicate corresponding parts in all the figures.

Figure 1:
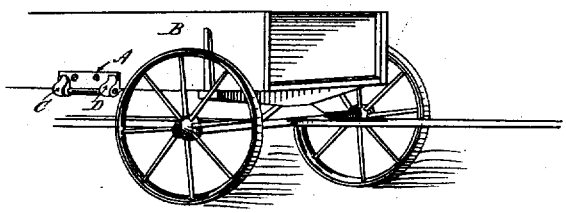
Figure 2:
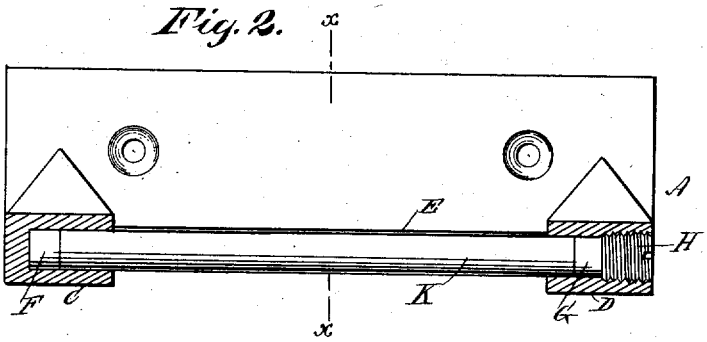
Figure 3:
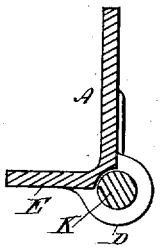

Figure 1 is a perspective view illustrating a wear-iron embodying my improvement applied to a vehicle. Fig. 2 is a sectional side elevation of the same; and Fig. 3 is a cross-sectional view of the same on the line X X, Fig. 2.

The following is a description of the annexed drawings:

The right-angular plate A is adapted to set over the said angle of the vehicle-body B in the path of the wheels when turned, and is provided with holes in its wings to receive fastening screws or nails.

Diagonally in front of the apex of the angle a longitudinal socket C, closed at its outer end and open at its inner end, is formed at one end of the angle-plate, and at the other end thereof and in line with the socket C is formed a longitudinal sleeve D, open at both ends. Both bearings may be formed with a through-bore, as is the sleeve D, if desired.

In the straight apex or ridge of the angle-plate is also formed a concave bearing or seat E in line with and connecting the bores of the sleeve D and socket C.

In the socket C and sleeve D is mounted loosely a plain cylindrical friction-roller K, preferably of chilled steel, which thus also is seated in the concave bearing E, so as to be supported between its end bearings.

A cylindrical rubber, leather, or other yielding block or spring F is placed in one or both bearings C and D to abut the ends of the roller K, and a threaded plug H is screwed lengthwise into the outer end of the bearing D or into both bearings when both are formed with a through-bore, the bearing being interiorly threaded to receive the screw-plug H, and the latter acts to press the block or spring F against the roller, and thus prevent all rattling. The smooth end of the plug further forms a uniform bearing for the block G, and hence for the end of the roller, while the latter may be readily removed for renewal by unscrewing the plug and withdrawing the roller lengthwise from the sleeve and socket.

The sleeve, socket, and connecting concave bearing being formed diagonally in front of the angle, as described, the roller is brought to the proper position and the strain taken up equally by both wings of the angle-plate.

By having the friction-roller K seated in the concave bearing E a small light roller may be employed, as the bearing will prevent any danger of the roller being bent or broken by a blow of the wheel in turning the vehicle.

It frequently happens that in turning the wagon the front wheel strikes the fender hard enough to raise it up and pass under the body against the bottom wing of the fender, ultimately cutting it off. Now, by my improvement this objection is overcome, for it will be observed that in this fender the roller has a bearing between its two end bearings, consisting of a cavity made in the apex of the angle on a diagonal line drawn through the angle formed by the wings of the fender, and that the periphery of the roller is made to extend beyond the outside surface of each of the fender-wings. The wagon-wheel being thus prevented from striking either the under or side wing of the fender, at the same time the end bearings of the roller are saved from undue strain and the roller itself is kept from springing either backward or forward by the aid of said bearing-cavity, as above stated.

Having thus fully described my invention, I claim as new and desire to secure by Letters Patent—

1. The combination, with the angle-plate formed with end bearings at its angle, of a roller mounted in said bearings, yielding blocks in said bearings abutting the ends of the roller, and a screw-plug in one of the bearings acting to press the yielding blocks and the roller together, substantially as described.

2. The herein-described wear-irons for vehicles, consisting of an angle-plate formed with a longitudinal socket at one end of its angle, a longitudinal sleeve at the other end thereof threaded internally at its other end, and a concave bearing between and in line with the said sleeve and socket, a plain cylindrical friction-roller mounted to turn in the socket, bearing, and sleeve, a threaded plug screwing lengthwise in the outer threaded end of the sleeve, and compressible rubber or kindred blocks interposed between the ends of the roller, and the socket-head and screw-plug, respectively, substantially as described.

3. In a wear-iron for vehicles, an angle-plate adapted to set over the angle of the vehicle-body and formed with a longitudinal socket at one end, a longitudinal sleeve at the other end, and a concave roller-bearing connecting and in line with the said sleeve and socket, said sleeve, socket, and bearing being all diagonally in front of the angle of the plate, as and for the purpose specified.

4. In a wagon-fender, a roller, an angle-plate provided with diagonal bearings to support the ends of said roller and with a bearing-surface at the apex of the angle formed by the wings of said plate, whereby the periphery of said roller extends beyond the outside of both wings of the fender and is provided with a bearing on the angle of said plate between its end bearings, substantially as described.

5. The combination, with the angle-plate formed with end bearings, of a roller mounted in said bearings, a yielding block or spring in one or both of said bearings at the ends of the roller, and a screw-plug, on which said yielding block or spring is seated, substantially as described.

JACOB M. R. GEDNEY.

Witnesses:
MILLARD R. JONES,
DELMON F. RENNE,
J. R. INGERSOLL.